US007433840B2

(12) United States Patent  
Carnahan et al.

(10) Patent No.: US 7,433,840 B2  
(45) Date of Patent: *Oct. 7, 2008

(54) SYSTEM AND METHOD FOR DYNAMIC, MULTIVARIABLE COMPARISON OF FINANCIAL PRODUCTS

(75) Inventors: John Carnahan, Hockessin, DE (US); Bill Wallace, Downingtown, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/686,094

(22) Filed: Mar. 14, 2007

(65) Prior Publication Data

US 2007/0192312 A1    Aug. 16, 2007

Related U.S. Application Data

(63) Continuation of application No. 09/552,879, filed on Apr. 20, 2000, now Pat. No. 7,212,996.

(51) Int. Cl.
*G06Q 40/00* (2006.01)

(52) U.S. Cl. .................... 705/36 R; 705/35; 705/37; 705/38

(58) Field of Classification Search .............. 705/36, 705/35, 37, 38
See application file for complete search history.

(56) References Cited

U.S. PATENT DOCUMENTS

| | | | |
|---|---|---|---|
| 3,634,669 A | 1/1972 | Soumas et al. | |
| 4,254,474 A | 3/1981 | Cooper et al. | |
| 4,598,367 A | 7/1986 | DeFrancesco et al. | |
| 4,642,768 A | 2/1987 | Roberts | |
| 4,736,294 A | 4/1988 | Gill et al. | |

(Continued)

FOREIGN PATENT DOCUMENTS

WO    WO 99/27432    6/1999

(Continued)

OTHER PUBLICATIONS

Robert E. Cumby, jack D. Glen; Evaluating the Performance of International Mutual Funds; Journal of Finance; vol. 45, No. 2 Jun. 1990), pp. 497-521.*

(Continued)

*Primary Examiner*—Narayanswamy Subramanian  
*Assistant Examiner*—Siegfried E. Chencinski  
(74) *Attorney, Agent, or Firm*—Goodwin Procter LLP

(57) ABSTRACT

A multivariable search system for the comparative analysis of financial products allows the user to enter a set of criteria of their choice with desired ranges and in addition, a weighting factor to be applied to the criteria. Mutual funds, for instance, may be searched according to desired rates of return, fund type categories, and assigned levels of weight or emphasis on different ones of the criteria. Search results may be returned in coded form, indicating which candidate products they match all of the selected criteria, and which ones generate the highest net score given the weighting and other factors. Searches may be revised or refined based on the presented results, or new searches may be performed. Hot linkable connections may be presented to transaction sites to carry out purchases, obtain prospectuses, or other activities relating to the mutual fund or other financial products returned.

20 Claims, 27 Drawing Sheets

U.S. PATENT DOCUMENTS

| | | | |
|---|---|---|---|
| 4,739,478 A | 4/1988 | Roberts et al. | |
| 4,760,604 A | 7/1988 | Cooper et al. | |
| 4,831,526 A | 5/1989 | Luchs et al. | |
| 4,866,634 A | 9/1989 | Reboh et al. | |
| 4,897,811 A | 1/1990 | Scofield | |
| 5,220,500 A | 6/1993 | Baird et al. | |
| 5,227,874 A | 7/1993 | Von Kohorn | |
| 5,231,571 A | 7/1993 | D'Agostino | |
| 5,278,751 A | 1/1994 | Adiano et al. | |
| 5,321,833 A * | 6/1994 | Chang et al. | 707/5 |
| 5,444,844 A | 8/1995 | Inoue et al. | |
| 5,481,647 A | 1/1996 | Brody et al. | |
| 5,523,942 A | 6/1996 | Tyler et al. | |
| 5,551,021 A | 8/1996 | Harada et al. | |
| 5,583,778 A | 12/1996 | Wind | |
| 5,592,590 A | 1/1997 | Jolly | |
| 5,603,025 A | 2/1997 | Tabb et al. | |
| 5,606,496 A | 2/1997 | D'Agostino | |
| 5,611,052 A | 3/1997 | Dykstra et al. | |
| 5,649,116 A | 7/1997 | McCoy et al. | |
| 5,655,085 A | 8/1997 | Ryan et al. | |
| 5,717,865 A | 2/1998 | Stratmann | |
| 5,732,397 A | 3/1998 | DeTore et al. | |
| 5,758,328 A | 5/1998 | Giovannoli | |
| 5,765,144 A | 6/1998 | Larche et al. | |
| 5,774,878 A | 6/1998 | Marshall | |
| 5,774,883 A | 6/1998 | Andersen et al. | |
| 5,802,502 A | 9/1998 | Gell et al. | |
| 5,842,178 A | 11/1998 | Giovannoli | |
| 5,848,400 A | 12/1998 | Chang | |
| 5,852,811 A | 12/1998 | Atkins | |
| 5,870,721 A | 2/1999 | Norris | |
| 5,873,096 A | 2/1999 | Lim et al. | |
| 5,875,437 A | 2/1999 | Atkins | |
| 5,878,403 A | 3/1999 | DeFrancesco et al. | |
| 5,913,202 A | 6/1999 | Motoyama et al. | |
| 5,918,217 A | 6/1999 | Maggioncalda et al. | |
| 5,920,848 A | 7/1999 | Schutzer et al. | |
| 5,930,775 A | 7/1999 | McCauley et al. | |
| 5,940,811 A | 8/1999 | Norris | |
| 5,940,812 A | 8/1999 | Tengel et al. | |
| 5,963,953 A | 10/1999 | Cram et al. | |
| 5,987,434 A | 11/1999 | Libman | |
| 6,009,415 A | 12/1999 | Shurling | |
| 6,018,722 A | 1/2000 | Ray | |
| 6,021,397 A | 2/2000 | Jones | |
| 6,029,195 A * | 2/2000 | Herz | 725/116 |
| 6,078,900 A | 6/2000 | Ettl et al. | |
| 6,088,686 A | 7/2000 | Walker | |
| 6,144,944 A | 11/2000 | Kurtzman et al. | |
| 6,192,314 B1 | 2/2001 | Khavekh et al. | |
| 6,199,077 B1 | 3/2001 | Inala | |
| 6,202,053 B1 | 3/2001 | Christiansen | |
| 6,298,303 B1 | 10/2001 | Khavekh et al. | |
| 6,317,726 B1 | 11/2001 | O'Shaughnessy | |
| 6,327,574 B1 | 12/2001 | Kramer | |
| 6,370,516 B1 | 4/2002 | Reese | |
| 6,487,497 B2 | 11/2002 | Khavekh et al. | |
| 6,601,044 B1 * | 7/2003 | Wallman | 705/36 R |
| 6,609,118 B1 | 8/2003 | Khedkar et al. | |
| 6,629,082 B1 | 9/2003 | Hambrecht et al. | |
| 6,836,763 B1 | 12/2004 | Munsil et al. | |
| 2002/0011850 A1 | 1/2002 | Togashi et al. | |
| 2002/0059139 A1 | 5/2002 | Evans | |
| 2003/0028319 A1 | 2/2003 | Khavekh et al. | |
| 2003/0208483 A1 | 11/2003 | Satomi et al. | |

FOREIGN PATENT DOCUMENTS

| | | |
|---|---|---|
| WO | WO 99/39290 | 8/1999 |
| WO | WO 01/11532 | 2/2001 |

OTHER PUBLICATIONS

Tim McLaughlin; Tapping Web to Search for Right Fund—FundProfiler Speeds Search; Boston Herald; Dec. 16, 1999; p. 70.*

John Markese; Can You Trust Mutual Fund Rankings? Consumer Research; Oct. 1993; pp. 20-24.*

"At Your Request™," from www.wingspanbank.com, select "Bank," then select "Concierge Services," Wingspan was first disclosed to public on Jun. 24, 1999.

"Collections Strategy Model Phase II Proposal," Applied Decision Analysis, Inc. in coordination with First USA Bank, Aug. 7, 1996, pp. 1-29; "Collections Strategy Model Phase I Results—Appendix A," 11 pages.

"Credit Scoring New Markets (Credit disadvantaged people are proving to be a lucrative lending market for banks)," Bank Technology News, vol. 9, No. 7, Jul. 1996, 5 pages.

"CTI (Computer-Telephony Integration)," CSU/DSU (Channel Service Unite/Data Service Unit), author unknown, pp. 208-210.

"Internet bank moves closer to virtual reality," in USA Today, by Robyn Meredith, May 5, 1995, 1 page.

"The Sub-Prime Credit Market: Identifying Good Risks for Unsecured Cards," Credit World, vol. 85, No. 1, by James J. Carey, Sep. 1996, 4 pages.

Asch, Latimer, How the RMAIFair, Isaac credit-scoring model was built, Journal of Commercial Lending, vol. 77, No. 10, pp. 10-16, Jun. 1995.

Carey, James J., The Sub-Prime Credit Market: Identifying Good Risks for Unsecured Cards vol. 85, No. 1, Credit World, pp. 13-15, Sep. 1996.

Credit Scoring New Markets, Bank Technology News, vol. 9, No. 7, p. 1, Jun. 1996.

Fred Fortner, There Must be a Better Way, Mortgage Banking vol. 53, No. 2, pp. 12-22, Nov. 1, 1992.

FreeMarkets® Web Applications Informational Brochure, including the following sections: 1-Buyers Saving Money; 2-Suppliers Growing Sales; 3-About FreeMarkets; 4-Career Opportunities; 5-Contacts; 6-What's New; and 7-Index, 1999, 34 pages.

Friedland, Marc, Credit Scoring Digs Deeper into Data, Credit World, vol. 84, No. 5, pp. 19-23, May 1996.

Harris InfoSource Information Products to Grow Your Sales Brochure, including sections 1-About Harris InfoSource; 2-Information Solutions; 3-Harris InfoOnline; 4-Order a Product; 5-Online Resources; and 6-Contact us, Apr. 26, 1999, 12 pages.

Hickman, Michael, Using Software to Soften Big-Time Competition, Bank Systems & Technology, vol. 31, No. 8, pp. 38-40, Jun. 1994.

Jameson, Ron, Expanding Risk Management Strategies: Key to Future Survival, vol. 84, No. 5, Credit World, pp. 16-18, May 1996.

Makuch, Willaim J., Managing Consumer Credit Delinquency in the US Economy: A Multi-Billion Dollar Management Science Application, Interfaces, pp. 90-109, Feb. 1992.

Opportunity Knocks at Scoring's Door (Trends and developments in scoring technology examined; scoring now is used for everything from prescreening credit card applicants o debt collections), Collections & Credit Risk, vol. 2, No. 4, Apr. 1997, 6 pages.

Opportunity Knocks at Scoring's Door, Collection & Credit Risk, vol. 2, No. 4, Apr. 1997.

Product Data Integration Technologies, Inc. Informational Brochure, including sections 1-The Company; 2-Services; 3-Products; 4-Communications Center; 5-Career Center; 6-New on the Site; and 7-Search our Site.

Roger, John C. et al, A Credit Scoring Model to Evaluate the Credit Worthiness of Credit Card Applicants, Developments in Marketing Science, vol. 5, 1982.

Sullivan, Deidre, Scoring Borrower Risk, Mortgage Banking, vol. 55, No. 2, pp. 94-98, Nov. 1994.

Taylor, Clair et al, Card Issuers Turn to Scoring as They Face Increasing Risk, Financial Services Report, vol. 8, No. 15, p. 1, Jul. 24, 1991.

"All-In-One Consumer Guide to Online Personal Finance Debuts" PR Newswire, May 17, 2000, p. 1-2.

WingspanBank.com and Frictionless Commerce Launch New Service for Finding, Comparing, and Purchasing Mutual Funds' Business Wire, Dec. 6, 1999, p. 1-2.

Snel, "Wingspan Adds Supercharged Fund Search Feature", American Banker, v. 164, n. 232 p. 26 Dec. 6, 1999.

Washington Post; "*Credit Card Issuers Keeping a Closer Watch on How Yu Pay Bills*", Apr. 25, 1988, (Business Section).

"CSM II Project Summary," First USA Collections Support & Development Operations Research Group, Nov. 5, 1996, 13 pages.

"Collections Strategy Model Phase 2," First USA Bank, by Ric Kosiba et al, Oct. 25, 1996, 10 pages.

"How the RMA/Fair, Issac credit-scoring model was built," Journal of Commercial Lending, vol. 77, No. 10, Jun. 1995, by Latimer Asch, 5 pages.

Card issuers turn to scoring as they face increasing risk (bank card issuers consider risk factor in implementing applicant scoring for evaluating their accounts), Financial Services Report, vol. 8, No. 15, by Claire E. Taylor, Jul. 24, 1991, 3 pages.

"SBA/Pro-Net," U.S. Small Business Administration Procurement Marketing and Access Network website, earliest date of Sep. 27, 1997, 11 pages.

\* cited by examiner

WING

If your bank could start over, this is what it would be.

○ Log in to my account
○ Open a new account

2.9% INTRO APR*

5% CASH BACK*

Platinum Visa: Special holiday savings, great rates and 5% cash back!*
Wingspan Investment Services: New FundProfiler! Test drive tomorrow's mutual FundProfiler today!**
Toys for Tots: Join us in donating online.
Online Checking: No monthly fees. Bill Pay, ATM rebates, direct deposit, and great rates!

| | WingspanBank APR | National Average | Investment Information Provided by Wingspan Investment Services** | |
|---|---|---|---|---|
| Home Equity Loan | 8.74%*** | 8.95% | Symbol | Symbol Lookup [Get Quote] |
| Personal Loans | 12.99% | 14.30% | | [Display] |

Bank - Loans - Brokerage - Insurance - Pay Bills - Plan - Apply - About - Help - Contact Us - Home
MEMBER ©1999, WingspanBank.com, a division of First USA Bank, N.A. Privacy Policy, Terms of Use, and y2k Policy
FDIC

* You will first be considered for a Platinum Visa card with Tier 1 pricing, which has an APR for purchases and balance transfers after the introductory period of 13.49% variable. If you do not qualify for the Tier 1 pricing, you will automatically be considered for a Platinum Visa card with Tier 2 pricing, which has an APR for purchases and balance transfers after the introductory period of 16.24% variable. The APR for cash advances for Tier 1 is 20.49% variable and Tier 2 is 20.24% variable. Please see terms and conditions for full details.

** Investments are provided by Wingspan Investment Services, Inc., a registered broker/dealer and member NASD, SIPC. Investment products are not FDIC insured, and are not obligations of or guaranteed by any Wingspan-affiliated bank. Investments are subject to market risk, including the possible loss of principal.

*** The "as low as" rate range from 8.74% to 8.94% APR is valid only on loans having 85% or less loan-to-value, ten year term, up to $500,000. All loans are subject to satisfactory appraisal, title, and insurance. The Annual Percentage Rate as of December 6, 1999 ranges from 8.74% to 13.82%. Rates reflect the optional automatic payment from a checking or savings account for states of AZ, CO, IL, IN, KY, LA, MI, OH, OK, TX, UT, WI, and WV. Rates subject to change at any time without notice and may be higher than the rate currently offered. Actual rate will vary depending term of loan, loan amount, loan-to-value ratio, credit history, Bank One's internal credit policies, the state where your loan originated, and the date your application is received. Rates also available for loans with loan-to-value ratios of 86-100%, except in Texas. In Texas the maximum loan-to-value is 80%. The "no closing costs" offer excludes the loan origination fee, title insurance (when required), and mortgage taxes (if any). The loan origination fee will range from $0 to $50 depending on the state in which your loan originated and the date your application is received. For example, a $25,000 loan for 10 years at an interest rate of 9.44% with a loan origination fee of $50 will have an APR of 9.49% and a monthly payment of $323.32. Please call us for information regarding the fees and rate applicable for your state. The amount of the loan you qualify for depends on your annual gross income and the lendable equity in your home less any debt secured by your home. Homeowners must be 18 years of age or older. Purposes of loans may be restricted by state law and Bank One credit policy. Other restrictions may apply. Property and flood insurance may be required. Consult your tax advisor regarding deductibility of interest.

WINGSPAN INVESTMENT SERVICES, INC.
Member NASD/SIPC

▶ Trading Demo  ▶ Portfolio Demo  ▶ Research  ▶ Marketwatch  ▶ Quotes & News  ▶ Customer Services

Wingspan FundProfiler Detailed Instructions

Detailed Instructions
FundProfiler, a sophisticated search tool, sifts through more than seven thousand mutual funds to compile a list of mutual funds that match specific investment priorities. FundProfiler takes you through three main screens: start, criteria, and results.

Start
On the "Start" screen, FundProfiler provides five predefined profiles and a custom option. Choose the profile that most closely describes the type of fund you are seeking. Choose the custom option if none of the predefined profiles adequately describes the type of fund you are seeking.

Note: Exposure to market fluctuations is associated with investor risk. Funds with high exposure to market fluctuations tend to present investors with more risk; funds with low exposure to market present investors with less risk.

Criteria
The Criteria screen lists 11 mutual fund features. For more information about a feature, select the corresponding "Learn More" button.

You can set criteria for each feature. If, on the Start screen, you select:

- A predefined profile, the criteria for each feature will be preset.
- The custom option, no criteria will be set.

You can customize your profile by editing a predefined profile. Use the "Edit" buttons next to each feature to select the criteria that best describe the type of mutual fund you are shopping for. For example, use the "Edit" button next to investment objective to choose an investment objective from a drop-down list that includes growth, growth and income, income, etc.
Use the radio buttons to the right of each feature to indicate how important the feature is to your overall investment objective. The radio buttons:

- Range from most important (left) to least important (right).
- Tell the FundProfiler which features you are most concerned with and which concern you less.

For example, if a fund's ten-year performance is more important to you than a fund's annual portfolio turnover, position the ten-year performance indicator further to the left than the annual portfolio turnover indicator.
You can ensure that all of the funds in your results have the criteria you've indicated for a specific feature by selecting the corresponding "must have" radio button. Each must have feature generally reduces the number of funds in your final results. However, if you do not indicate that a feature must have the criteria that you've selected, your resulting funds may not exactly match your criteria.

Results
The Results screen lists funds that meet, or closely match, the criteria you set forth on the Criteria screen. You can sort your resulting funds according to a variety of options. Initially, FundProfiler sorts your results by match score.

The match score:

- Indicates how closely the fund meets the criteria you selected on the previous screen, taking into account the relative importance you assigned to each criterion.
- Is not a rating of the fund's quality. Funds with high match scores are not better than funds with low match scores; rather, funds with high match scores more closely match the criteria you selected, weighted by the relative importance you assigned to each, than funds with low match scores.

You can access important information about a fund—including a breakdown of the fund's features compared to the criteria you selected—by clicking on the fund's ticker symbol.

Please keep these important notes in mind as you use FundProfiler

- Asset Allocation. Asset allocation is an important factor in a portfolio's total long-term performance. While FundProfiler does not address asset allocation, it can help you select mutual funds from each asset class. If you are allocating your portfolio across different asset classes or investment styles, as many investors do, use FundProfiler again and again to review funds in each of your allocation categories.
- Funds. FundProfiler does not make fund recommendations, nor does it rank the funds displayed. FundProfiler is an information tool only. A fund's past performance does not indicate future results.
- Prospectuses. You can order free prospectuses through FundProfiler by selecting the fund's "Prospectus" button. Read the fund's prospectus carefully before you invest. If you do not have a Wingspan Investment Services (WIS) account, you will need to provide delivery information.
- Purchases. Not all funds are available for sale through WIS; not all funds are available for sale to residents of every state. If you have a WIS account, you can purchase mutual funds through FundProfiler by selecting the "Buy" button. Applicable WIS transaction costs, if any, will be disclosed at the point of purchase. If you do not have a WIS account, you cannot purchase mutual funds through FundProfiler, but you can apply for a WIS account by selecting the "Apply" button.
- Taxes. Some mutual funds provide tax benefits such as tax-exempt status. Wingspan Investment Services' FundProfiler does not include tax exempt funds.

If you have any questions regarding FundProfiler, please contact our customer service representatives at 1-888-420-7440 Monday through Friday, 8:30 a.m. to 10 p.m. Eastern time.

FundProfiler does not make recommendations for mutual fund purchases. It does not rank by quality, nor rate any fund better than any other fund. It does provide you with important information on the funds within its database. Always read a prospectus carefully before investing. The prospectus contains additional information including fees, charges, and expenses. FundProfiler does not constitute an offer of sale for any of the funds displayed. Such offer can only be made by the fund's own prospectus.

Go To FundProfiler          102

FIG. 2(e)

WINGSPAN INVESTMENT SERVICES, INC.

Apply | About | Help    Bank   Loans   Brokerage   Insurance   Pay Bills   Plan WINGSPAN
INVESTMENT
SERVICES, INC.
Member NASD/SIPC ▶ Trading Demo  ▶ Portfolio Demo  ▶ Research  ▶ Marketwatch  ▶ Quotes & News  ▶ Customer Services

FundProfiler          ❶ Start   ❷ Criteria   ❸ Results

Step One: Select a Profile   [NEXT]

Select the profile from the table below that best describes the type of fund you are seeking.

- ⦿ Custom- I prefer to set my own preferences. I do not want any default values set for me.
- ○ Very Conservative- I want to search for funds that seek current income and seek to minimize exposure to market fluctuations.
- ○ Conservative- I want to search for funds that seek current income. I am willing to accept moderate exposure to market fluctuations in exchange for potentially higher returns.
- ○ Moderate- I want to search for funds that seek higher income and/or a blend of growth and income. I am willing to accept varying degrees of exposure to market fluctuations in exchange for potentially higher returns.
- ○ Moderate Aggressive- I want to search for funds that seek high total return. I am willing to accept high exposure to market fluctuations in exchange for potentially higher returns.
- ○ Very Aggressive- I want to search for funds that seek high capital growth, very high total returns, and/or limited diversification. I am willing to accept very high exposure to market fluctuations in exchange for potentially higher returns.

[NEXT]

Quick Search Enter a fund family name to narrow your search:

[____] [GO]

NOT FDIC INSURED * MAY LOSE VALUE * NO BANK GUARANTEE

Copyright © 1998, 1999. All rights reserved.
Copyright © 1999 Reuters S.A. All rights reserved. Click for restrictions.

Bank - Loans - Brokerage - Insurance - Pay Bills - Plan - Apply - About - Help - Home
© 1999, WingspanBank.com Privacy Policy, Terms of Use, and y2k Policy

Lipper   DEMAND Frictionless Commerce

Disclosure    Disclosure

WINGSPAN INVESTMENT SERVICES, INC.
Member NASD/SIPC

▶ Trading Demo  ▶ Portfolio Demo  ▶ Research  ▶ Marketwatch  ▶ Quotes & News  ▶ Customer Services

FundProfiler     ❶ Start  ❷ Criteria  ❸ Results

Step Two: Choose Your Criteria     [PREVIOUS] [NEXT]

We will compile a list of mutual funds that match, or closely match, the criteria you specify for each feature below. The initial settings are based on the profile you selected; tailor your results by changing the settings to match the funds you are seeking.

You can use the "Edit" buttons to choose a range for each feature. Use the radio buttons to select the importance of each feature to you. The "Must Have" radio buttons will ensure that results meet your specific criteria.

| Features | Criteria | | | | | | |
|---|---|---|---|---|---|---|---|
| Performance: 1 Year  learn more | [EDIT] No Preference | ○ | ○ | ○ | ● | ○ | ○ |
| Performance: 5 Years  learn more | [EDIT] No Preference | ○ | ○ | ○ | ● | ○ | ○ |
| Performance: 10 Years  learn more | [EDIT] No Preference | ○ | ○ | ○ | ● | ○ | ○ |
| Performance: Year to Date  learn more | [EDIT] No Preference | ○ | ○ | ○ | ● | ○ | ○ |
| Performance: Since Inception  learn more | [EDIT] No Preference | ○ | ○ | ○ | ● | ○ | ○ |
| Total Expense Ratio  learn more | [EDIT] No Preference | ○ | ○ | ○ | ● | ○ | ○ |
| Operations  learn more | [EDIT] No Preference | ○ | ○ | ○ | ● | ○ | ○ |
| Annual Portfolio Turnover  learn more | [EDIT] No Preference | ○ | ○ | ○ | ● | ○ | ○ |
| Portfolio Manager Tenure  learn more | [EDIT] No Preference | ○ | ○ | ○ | ● | ○ | ○ |
| Risk  learn more | [EDIT] No Preference | ○ | ○ | ○ | ● | ○ | ○ |
| Investment Objective  learn more | [EDIT] No Preference | ○ | ○ | ○ | ● | ○ | ○ |

120 ◀     124 ↘

 

---

NOT FDIC INSURED * MAY LOSE VALUE * NO BANK GUARANTEE

Copyright © 1998, 1999 All rights reserved.
Copyright © 1999 Reuters S.A. All rights reserved. Click for restrictions.

Bank - Loans - Brokerage - Insurance - Pay Bills - Plan - Apply - About - Help - Home
© 1999, WingspanBank.com Privacy Policy, Terms of Use, and y2k Policy

102

Lipper A REUTERS Company     DEMAND Frictionless Commerce

Disclosure     Disclosure

WINGSPAN
INVESTMENT
SERVICES, INC.
Member NASD/SIPC

▶ Trading Demo ▶ Portfolio Demo ▶ Research ▶ Marketwatch ▶ Quotes & News ▶ Customer Services

FundProfiler

❶ Start ❷ Criteria ❸ Results

PREVIOUS

Step Three: View Your Results

We have compiled the list of funds below based on the criteria you selected. To view more information about the table's symbols and buttons, check out the Key.

Funds Found: 5555

Funds Searched: 5555
Fund Families Searched: 494

Sort by: [Match Score ▼] GO

102

Funds are sorted by the Match Score. To sort by another criteria click the drop-down box to the right and select that item.

DISPLAY   To view details for up to three funds, side-by-side, check their boxes and select the "Display" button.

| | Symbol | Fund Name | Match Score | 1 Year Return | 5 Year Return | 10 Year Return | Since Inception | Inception Date | | |
|---|---|---|---|---|---|---|---|---|---|---|
| ☑ | INTEX | 1838 Investment Advisors Funds: 1838 International Equity Fund | 100 / 122 | 33.20% | n/a | n/a | 13.70% | 08/03/1995 | APPLY | PROSPECTUS |
| ☑ | ACGFX | AARP Growth Trust: AARP Capital Growth Fund | 100 / 122 | 35.00% 25.20% 15.50% | | 17.10% | 12/04/1984 | APPLY | PROSPECTUS |
| ☑ | AAISX | AARP Growth Trust: AARP International Growth & Income Fund | 100 | 21.10% | n/a | n/a | 13.20% | 02/03/1997 | APPLY | PROSPECTUS |
| ☐ | AUSSX | AARP Growth Trust: AARP U.S. Stock Index Fund | 100 | 23.40% | n/a | n/a | 24.10% | 02/03/1997 | APPLY | PROSPECTUS |
| ☐ | RIEQX | ABN AMRO Funds: International Equity Fund; Common Class Shares | 100 | 31.30% | 13.60% | n/a | 14.50% | 01/04/1993 | APPLY | PROSPECTUS |
| ☐ | RLAEX | ABN AMRO Funds: Latin America Equity Fund; Common Class Shares | 100 | 24.60% | n/a | n/a | 4.60% | 06/28/1996 | APPLY | PROSPECTUS |
| ☐ | AIINX | Accessor Funds, Inc.: International Equity Portfolio; | 100 / 122 | 37.10% | n/a | n/a | 13.40% | 07/06/1998 | APPLY | PROSPECTUS |

| | Investor Class Shares | | | | | |
|---|---|---|---|---|---|---|
| ☐ | AGROX | Accessor Funds, Inc.: Growth Portfolio; Advisor Class Shares | 100 | 29.90% 29.10% n/a | 23.80% 08/24/1992 | APPLY PROSPECTUS |
| ☐ | AGRIX | Accessor Funds, Inc.: Growth Portfolio; Investor Class Shares | 100 | 29.30% n/a n/a | 22.50% 07/01/1998 | APPLY PROSPECTUS |
| ☐ | ACIEX | Accessor Funds, Inc.: International Equity Portfolio; Advisor Class Shares | 100 | 37.80% 13.90% n/a | 13.40% 10/03/1994 | APPLY PROSPECTUS |

DISPLAY   To view details for up to three funds, side-by-side, check their boxes and select the "Display" button.   Go to page: [1] of 556   GO
                                                                                                                    Next Page >
Quick Search  Enter a fund family name to narrow your search:                                                       Results per page:
              [         ] GO                                                                                        [10] GO START OVER                                                                                                          PREVIOUS

Key

DISPLAY        To view details for up to three funds, side-by-side, check their boxes and select the "Display" button.

Symbol         To view fund details, click on the fund's ticker symbol.

Match Score    A measure of how closely a fund matches your selected criteria. Match scores, which range from zero to 100, do not represent an investment recommendation or ranking by investment performance. For an analysis of the score, click on the colored bars (■ ▓).
               A blue bar indicates that a fund matches all of your preferences.
               A yellow bar indicates that a fund is missing one or more of your preferences.

Returns        The fund's performance over the past one year, five years, ten years, or since inception. Past performance is not indicative of future returns.

Inception Date The date the fund was opened to investors.

APPLY          If you want to purchase a fund but you do not have a Wingspan Investment Services account, select the "Apply" button and complete our online application.

PROSPECTUS     Before investing or sending money, read the prospectus carefully. If you want to obtain:

FIG. 2(k)

- A free prospectus, which contains more information including fees, sales charges, and expenses, select the "Prospectus" button.
- More than one prospectus, note the ticker symbol; you will not be able to return to these results after making your initial prospectus request.

Quick Search    To view funds from just one family, use Quick Search.

START OVER    To choose a new profile, select the "Start Over" button.

NOT FDIC INSURED * MAY LOSE VALUE * NO BANK GUARANTEE

FundProfiler does not make recommendations for mutual fund purchases. It does not rank funds by quality, nor rate any fund better than any other fund. It does provide you with important information on the funds within its database. Always read a prospectus carefully before investing. The prospectus contains additional information including fees, charges, and expenses. FundProfiler does not constitute an offer of sale for any of the funds displayed. Such offer can only be made by the fund's own prospectus.

Copyright © 1996, 1999. All rights reserved.
Copyright © 1999 Reuters S.A. All rights reserved. Click for restrictions.

Bank - Loans - Brokerage - Insurance - Pay Bills - Plan - Apply - About - Help - Home
© 1999, WingspanBank.com Privacy Policy, Terms of Use, and y2k Policy

112

102

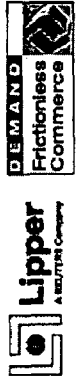

Disclosure

Disclosure

FIG. 2(l)

Prospectus Request

Thank you for your interest in WingspanBank.com. Please fill in the following information and the mutual fund prospectus will be mailed to you. You may also request up to four additional prospectuses on this form if you know the ticker symbol.

First Name*  M.I.  Last Name*

Mailing Address *

City*  State*  Zip Code*  Email Address*

/
128

Mutual Fund Ticker Symbol*

INTEX

Submit  Reset

* denotes required items

WINGSPAN INVESTMENT SERVICES, INC.
Member NASD/SIPC

▶ Trading Demo ▶ Portfolio Demo ▶ Research ▶ Marketwatch ▶ Quotes & News ▶ Customer Services

FundProfiler    ❶ Start ❷ Criteria ❸ Results

Match Score Analysis

The colored icons reflect how well a feature matches your preferences. The more blue the icon is, the better it matches your preferences. For more information about symbols and buttons, check out the Key.

Analysis of the Match Score

Fund: 1838 Investment Advisors Funds: 1838 Internatio...
Match Score:  100

Hits
1 important preferences are met. Your most important features are displayed below.

| Feature | Your Preference: | This Fund: |
|---|---|---|
| ❶ Performance: 1 Year- learn more | 5.00% - 20.00% | 33.20% |

Additional Information
There was no data for 2 of your important preferences.
You did not express a preference, or chose "Not Important" for 10 features.

To see how each feature measured up to the criteria you selected, click the Details button.

[ BACK ]    [ DETAILS ]

Key:

● ♦ ▸ ∗   These icons reflect how well a feature matches your preferences. The more blue the icon is, the better it matches your preferences ❶   The blue icon containing an exclamation point indicates that although this fund does not meet your preference, it may deem it more beneficial than the preference you selected (e.g.- a higher return than you specified), so please review it carefully.

✱   The yellow icon containing a red "x" indicates that your preference was not met ○   The open grey circle indicates that no preference, or "Not Important" was selected —   The grey hash mark or "n/a" indicates that data was not available, not applicable, or could not be verified

112

NOT FDIC INSURED * MAY LOSE VALUE * NO BANK GUARANTEE

Copyright © 1998, 1999. All rights reserved.
Copyright © 1999 Reuters S.A. All rights reserved. Click for restrictions.

102

Bank - Loans - Brokerage - Insurance - Pay Bills - Plan - Apply - About - Help - Home
© 1999, WingspanBank.com Privacy Policy, Terms of Use, and y2k Policy

FIG. 2(n)

▶ Trading Demo  ▶ Portfolio Demo  ▶ Research  ▶ Marketwatch  ▶ Quotes & News  ▶ Customer Services

FundProfiler

❶ Start  ❷ Criteria  ❸ Results

◀ BACK

Results - Display

Details for the funds you selected appear side-by-side below. The colored icons (●  ●) next to each feature indicate how well each feature matches the criteria you specified. The more blue an icon is, the better it matches your preferences. A yellow icon (●) indicates that your preference is not met. For more information about the symbols and buttons, check out the Key.

Funds Searched: 5555
Fund Families Searched: 494

| General Fund Information | 1838 Investment Advisors Funds: 1838 International Equity Fund |
|---|---|
| | APPLY / PROSPECTUS |
| Symbol | INTEX |
| Family | 1838 INVESTMENT ADVISORS L.P. |
| Objective | ○ International Funds |
| Match Score | ■ 100 |

| Features | |
|---|---|
| Expenses | |
| Maximum Sales Charge | .00% |
| 12B1 Fee Ratio | n/a |
| Performance: 1 Year | ● 33.20% |
| Performance: 5 Years | — n/a |
| Performance: 10 Years | — n/a |
| Performance: Year to Date | ○ 21.50% |
| Performance: Since Inception | ○ 13.70% |

FIG. 2(o)

| | | |
|---|---|---|
| Total Expense Ratio | ○ | 1.13% |
| Operations | | |
| Minimum Initial Investment | ○ | $1,000 |
| Minimum Subsequent Investment | | $0 |
| Minimum Initial Investment for IRA | | $0 |
| Periodic Investment | | Y |
| Systematic Withdrawal Plan Available | | Y |
| Annual Portfolio Turnover | | |
| Annual Portfolio Turnover | ○ | 1% |
| Portfolio Manager Tenure | | |
| Portfolio Manager Tenure | ○ | 4 Years |
| Portfolio Manager | | |
| Portfolio Manager | | Hans Van den Berg |
| Risk | | |
| Beta | ○ | .80 |
| Customer Services | | |
| Telephone Number | | 800-684-1838 |
| Fund General | | |
| Ticker Symbol | | INTEX |
| FPO Date | | 08/03/1995 |
| Total Net Assets | | $84.40MM |
| Total Net Asset Date | | 08/31/1999 |
| Fiscal Year End Date | | 10/31/1998 |
| Yield | | .00 |
| Yield Date | | 08/31/1999 |
| NAV | | |
| Change | | .23% |
| Portfolio | | |
| Holding One | | KOA Corp 2.8% |
| Holding Two | | Aiful Corp 2.01% |
| Holding Three | | Total SA Cl B 1.93% |
| Holding Four | | Mannesmann AG Ord 1.86% |
| Holding Five | | Advantest Corp 1.77% |
| Holding Six | | Zurich Allied AG 1.77% |
| Holding Seven | | SK Telecom Co Ltd 1.75% |
| Holding Eight | | Takeda Chemical Indust Ltd 1.73% |
| Holding Nine | | Societe Generale Cl A 1.72% |

FIG. 2(p)

Holding Ten  Adecco SA 1.67%
Cash Holdings  0.2
Equities Holdings  99.80%
Convertibles Holdings  .00%
Fixed Income Holdings  .00%
Other Holdings  .00%
Holding Valuation Date  06/30/1999

APPLY
PROSPECTUS

1838 Investment Advisors Funds: 1838 International Equity Fund

BACK

Top of page

Key

- ● ● ● These icons reflect how well a feature matches your preferences. The more blue the icon is, the better it matches your preferences.
- ● A blue icon containing an exclamation point indicates that although this fund does not meet your preference, it may deem it more beneficial than the preference you selected (e.g. - a higher return than you specified), so please review it carefully.
- ✱ The yellow icon containing a red "x" indicates that your preference was not met
- ○ The open grey circle indicates that no preference, or "Not Important" was selected
- — The grey hash mark or "n/a" indicates that data was not available, not applicable, or could not be verified

Match Score A measure of how closely a fund matches your selected criteria. Match scores, which range from zero to 100, do not represent an investment recommendation or ranking by investment performance. For an analysis of the score, click on the colored bars (▬▬).

The blue bar indicates that a fund matches all of your preferences.

A yellow bar indicates that a fund is missing one or more of your preferences.

APPLY If you want to purchase a fund but you do not have a Wingspan Investment Services account, select the "Apply" button and complete our online application.

PROSPECTUS Before investing or sending money, read the prospectus carefully. If you want to obtain:

- A free prospectus, which contains more information including fees, sales charges, and expenses, select the "Prospectus" button.
- More than one prospectus, note the ticker symbol; you will not be able to return to these results after making your initial prospectus request.

FIG. 2(q)

| | | | |
|---|---|---|---|
| Performance: Year to Date | | | |
| Performance: Year to Date | ○ 21.50% | ○ 20.50% | ○ 13.60% |
| Performance: Since Inception | | | |
| Performance: Since Inception | ○ 13.70% | ○ 17.10% | ○ 13.20% |
| Total Expense Ratio | | | |
| Total Expense Ratio | ○ 1.13% | ○ .87% | ○ 1.75% |
| Operations | | | |
| Minimum Initial Investment | ○ $1,000 | ○ $2,000 | ○ $2,000 |
| Minimum Subsequent Investment | $0 | $50 | $50 |
| Minimum Initial Investment for IRA | $0 | $250 | $250 |
| Periodic Investment | Y | Y | Y |
| Systematic Withdrawal Plan Available | Y | Y | Y |
| Annual Portfolio Turnover | | | |
| Annual Portfolio Turnover | ○ 1% | ○ 1% | ○ 2% |
| Portfolio Manager Tenure | | | |
| Portfolio Manager Tenure | ○ 4 Years | ○ 10 Years | ○ 0 Years |
| Portfolio Manager | | | |
| Portfolio Manager | Hans Van den Berg | Gadsden/Beaty | Cheng/Reilly/Lambert |
| Risks | | | |
| Beta | ○ .80 | ○ 1.08 | — n/a |
| Customer Service | | | |
| Telephone Number | 800-884-1838 | 800-322-2282 | 800-322-2282 |
| Fund General | | | |
| Ticker Symbol | INTEX | ACGFX | AAISX |
| FPO Date | 08/03/1995 | 12/04/1984 | 02/03/1997 |
| Total Net Assets | $84.40MM | $1,739.00MM | $34.40MM |
| Total Net Asset Date | 08/31/1999 | 08/31/1999 | 08/31/1999 |
| Fiscal Year End Date | 10/31/1998 | 09/30/1998 | 09/30/1998 |
| Yield | .00 | .38 | 1.05 |
| Yield Date | 08/31/1999 | 08/31/1999 | 08/31/1999 |
| NAV | | | |

FIG. 2(s)

| Change | .23% | .72% | .29% |
|---|---|---|---|
| Portfolio | | | |
| Holding One | KOA Corp 2.8% | INTEL CORP 4.1% | Nintendo Corp Ltd 3.47% |
| Holding Two | Aiful Corp 2.01% | A T & T CORP 3.24% | Sony Corp 3.01% |
| Holding Three | Total SA Cl B 1.93% | HOME DEPOT INC 3.21% | HSBC Hldgs PLC 2.98% |
| Holding Four | Mannesmann AG Ord 1.86% | MCI WORLDCOM INC COM 3.17% | Lasmo PLC 2.92% |
| Holding Five | Advantest Corp 1.77% | MICROSOFT CORP 3.09% | Hong Kong Telecom Ltd 2.83% |
| Holding Six | Zurich Allied AG 1.77% | AMERICAN INTL GROUP 2.93% | Accor SA 2.74% |
| Holding Seven | SK Telecom Co Ltd 1.75% | INTL BUSINESS MACH 2.88% | Penisular & Orint St Nav Co 2.54% |
| Holding Eight | Takeda Chemical Indust Ltd 1.73% | SUN MICROSYSTEMS INC 2.73% | SAP AG 2.51% |
| Holding Nine | Societe Generale Cl A 1.72% | DAYTON HUDSON CORP 2.63% | Royal & Sun Alliance Ins Group 2.5% |
| Holding Ten | Adecco SA 1.67% | BRISTOL MYERS SQUIBB 2.36% | Investor AB Cl B 2.47% |
| Cash Holdings | 0.2 | 4.55 | 3.2 |
| Equities Holdings | 99.80% | 97.18% | 89.60% |
| Convertibles Holdings | .00% | .00% | .00% |
| Fixed Income Holdings | .00% | .00% | 7.20% |
| Other Holdings | .00% | 1.73% | .00% |
| Holding Valuation Date | 06/30/1999 | 03/31/1999 | 06/30/1999 |
| | APPLY PROSPECTUS | APPLY PROSPECTUS | APPLY PROSPECTUS |
| | 1838 Investment Advisors Funds: 1838 International Equity Fund | AARP Growth Trust: AARP Capital Growth Fund | AARP Growth Trust: AARP International Growth & Income Fund |

112

102

BACK

Top of page

FIG. 2(t)

Key

- ● ◐ ◑ : These icons reflect how well a feature matches your preferences. The more blue the icon is, the better it matches your preferences.
- ◉ : A blue icon containing an exclamation point indicates that although this fund does not meet your preference, it may deem it more beneficial than the preference you selected (e.g. - a higher return than you specified), so please review it carefully.
- ✗ : The yellow icon containing a red "x" indicates that your preference was not met
- ○ : The open grey circle indicates that no preference, or "Not Important" was selected
- ∤ : The grey hash mark or "n/a" indicates that data was not available, not applicable, or could not be verified

Match Score A measure of how closely a fund matches your selected criteria. Match scores, which range from zero to 100, do not represent an investment recommendation or ranking by investment performance. For an analysis of the score, click on the colored bars (■ ▪).

▬▬▬▬ The blue bar indicates that a fund matches all of your preferences.

▬▬▬▬ A yellow bar indicates that a fund is missing one or more of your preferences.

APPLY If you want to purchase a fund but you do not have a Wingspan Investment Services account, select the "Apply" button and complete our online application.

PROSPECTUS Before investing or sending money, read the prospectus carefully. If you want to obtain:

- A free prospectus, which contains more information including fees, sales charges, and expenses, select the "Prospectus" button.
- More than one prospectus, note the ticker symbol; you will not be able to return to these results after making your initial prospectus request.

FundProfiler does not make recommendations for mutual fund purchases. It does not rank funds by quality, nor rate any fund better than any other fund. It does provide you with important information on the funds within its database. Always read a prospectus carefully before investing. The prospectus contains additional information including fees, charges, and expenses. FundProfiler does not constitute an offer of sale for any of the funds displayed. Such offer can only be made by the fund's own prospectus.

NOT FDIC INSURED * MAY LOSE VALUE * NO BANK GUARANTEE

Copyright © 1998, 1999. All rights reserved.
Copyright © 1999 Reuters S.A. All rights reserved. Click for restrictions Bank - Loans - Brokerage - Insurance - Pay Bills - Plan - Apply - About - Help - Home
© 1999, WingspanBank.com Privacy Policy, Terms of Use, and y2k Policy

WINGSPAN
INVESTMENT
SERVICES, INC.
Member NASD/SIPC

▶ Trading ▶ Portfolio ▶ Research ▶ Marketwatch ▶ Quotes & News ▶ Customer Services

FundProfiler

① Start ② Criteria ③ Results

[PREVIOUS]

Step Three: View Your Results

We have compiled the list of funds below based on the criteria you selected. To view more information about the table's symbols and buttons, check out the Key.

Funds Found: 5555

Funds Searched: 5555
Fund Families Searched: 494

Funds are sorted by the Match Score. To sort by another criteria click the drop-down box to the right and select that item.

Sort by: [Match Score ▼] [GO]

To view details for up to three funds, side-by-side, check their boxes and select the "Display" button.

| [DISPLAY] Symbol | Fund Name | Match Score | 1 Year Return | 5 Year Return | 10 Year Return | Since Inception | Inception Date | |
|---|---|---|---|---|---|---|---|---|
| ☑ INTEX | 1838 Investment Advisors Funds: 1838 International Equity Fund | 100 | 33.20% | n/a | n/a | 13.70% | 08/03/1995 | [BUY] [PROSPECTUS] |
| ☑ ACGFX | AARP Growth Trust: AARP Capital Growth Fund | 100 | 35.00% | 25.20% | 15.50% | 17.10% | 12/04/1984 | [BUY] [PROSPECTUS] |
| ☑ AAISX | AARP Growth Trust: AARP International Growth & Income Fund | 100 | 21.10% | n/a | n/a | 13.20% | 02/03/1997 | [BUY] [PROSPECTUS] |
| ☐ AUSSX | AARP Growth Trust: AARP U.S. Stock Index Fund | 100 | 23.40% | n/a | n/a | 24.10% | 02/03/1997 | [BUY] [PROSPECTUS] |
| ☐ RIEQX | ABN AMRO Funds: International Equity Fund; Common Class Shares | 100 | 31.30% | 13.60% | n/a | 14.50% | 01/04/1993 | [BUY] [PROSPECTUS] |
| ☐ RLAEX | ABN AMRO Funds: Latin America Equity Fund; Common Class Shares | 100 | 24.60% | n/a | n/a | 4.60% | 06/28/1996 | [BUY] [PROSPECTUS] |
| ☐ AINX | Accessor Funds, | | 37.10% | n/a | n/a | 13.40% | 07/06/1998 | [BUY] |

FIG. 2(v)

FundProfiler

Learn More

Performance: 1 Year

Usually expressed as a percentage, one-year performance is a measure of the return on an investment over the past 12 months. Performance is usually compared to other funds with similar investment strategies. While a fund's past performance does not indicate its future returns, it does provide a metric to compare funds with similar objectives under similar economic conditions.

[BACK]

NOT FDIC INSURED * MAY LOSE VALUE * NO BANK GUARANTEE

Copyright © 1958-1999. All rights reserved.
Copyright © 1999 Reuters S.A. All rights reserved. Click for restrictions.

Bank - Loans - Brokerage - Insurance - Pay Bills - Plan - Apply - About - Help - Home
© 1999, WingspanBank.com Privacy Policy, Terms of Use, and y2k Policy Lipper  |  DEMAND Frictionless Commerce
Disclosure  |  Disclosure

|   | | Inc.: International Equity Portfolio; Investor Class Shares | 100 | | | | PROSPECTUS |
|---|---|---|---|---|---|---|---|
| ☐ | AGROX | Accessor Funds, Inc.: Growth Portfolio; Advisor Class Shares | 100 | 29.90% | 29.10% | n/a | 23.80% 08/24/1992 BUY PROSPECTUS |
| ☐ | AGRIX | Accessor Funds, Inc.: Growth Portfolio; Investor Class Shares | 100 | 29.30% | n/a | n/a | 22.50% 07/01/1998 BUY PROSPECTUS |
| ☐ | ACIEX | Accessor Funds, Inc.: International Equity Portfolio; Advisor Class Shares | 100 | 37.80% | 13.90% | n/a | 13.40% 10/03/1994 BUY PROSPECTUS |

DISPLAY To view details for up to three funds, side-by-side, check their boxes and select the "Display" button.

Go to page: [ 1 ] of 556 GO
Next Page >

Quick Search Enter a fund family name to narrow your search:
[         ] GO

Results per page:
[ 10 ▼ ] GO

START OVER                                                                    PREVIOUS

Key

DISPLAY  To view details for up to three funds, side-by-side, check their boxes and select the "Display" button.

Symbol  To view fund details, click on the fund's ticker symbol.

Match Score  A measure of how closely a fund matches your selected criteria. Match scores, which range from zero to 100, do not represent an investment recommendation or ranking by investment performance. For an analysis of the score, click on the colored bars ( ▬ ▬ ).
A blue bar indicates that a fund matches all of your preferences.
▬  A yellow bar indicates that a fund is missing one or more of your preferences.

Returns  The fund's performance over the past one year, five years, ten years, or since inception. Past performance is not indicative of future returns.

Inception Date  The date the fund was opened to investors.

128 — BUY  If you want to purchase:

FIG. 2(w)

- A fund with your Wingspan Investment Services account, select the "Buy" button next to the fund. If you're not logged in, you will need to log in and return to this screen.
- More than one fund, note the ticker symbol; you will not be able to return to these results after making your initial purchase.

Note: The "Buy" button takes you to a screen where you can confirm your purchase. Not all funds displayed in the FundProfiler are available for purchase.

PROSPECTUS

/
128

Before investing or sending money, read the prospectus carefully. If you want to obtain:

- A free prospectus, which contains more information including fees, sales charges, and expenses, select the "Prospectus" button.
- More than one prospectus, note the ticker symbol; you will not be able to return to these results after making your initial prospectus request.

Quick Search   To view funds from just one family, use Quick Search.

START OVER   To choose a new profile, select the "Start Over" button.

FundProfiler does not make recommendations for mutual fund purchases. It does not rank funds by quality, nor rate any fund better than any other fund. It does provide you with important information on the funds within its database. Always read a prospectus carefully before investing. The prospectus contains additional information including fees, charges, and expenses. FundProfiler does not constitute an offer of sale for any of the funds displayed. Such offer can only be made by the fund's own prospectus.

NOT FDIC INSURED * MAY LOSE VALUE * NO BANK GUARANTEE

Copyright © 1998, 1999. All rights reserved.
Copyright © 1999 Reuters S.A. All rights reserved. Click for restrictions.

Bank - Loans - Brokerage - Insurance - Pay Bills - Plan - Apply - About - Help - Home
© 1999, WingspanBank.com Privacy Policy, Terms of Use, and y2k Policy

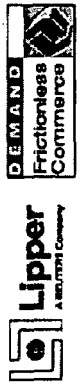

FIG. 2(x)

![Wingspan Investment Services - Buy Mutual Funds screen]

WINGSPAN
INVESTMENT SERVICES, INC.
Member NASD/SIPC

► Trading  ► Portfolio  ► Research  ► Marketwatch  ► Quotes & News  ► Customer Services

Buy Mutual Funds  65M034321

Trading
Stocks
  Buy/Sell
  Extended-Hours Trading
Options
  Buy Calls/Puts
  Close Calls/Puts
  Covered Calls
Mutual Funds
► Buy
  Redeem
  Exchange
Orders
  Order Status
  Cancel Order
  Change Order
Fees
  Schedule Fund name: AARP CAPITAL GROWTH FUND
Amount: The minimum investment amount is $1,000
Enter amount of purchase:
[____] dollars    128
-OR-
[____] shares Purchase amount is for principal only and does not include any transaction fees.

Reinvestment: Would you like to reinvest the dividends, income and capital gains of this fund?
  ● Yes  ○ No Prospectus: I have read, understand and accept the terms of the prospectus.
  ● Yes  ○ No

[Review Before Sending]

NOT FDIC INSURED * MAY LOSE VALUE * NO BANK GUARANTEE

Copyright © 1998, 1999. All rights Reserved.

Bank - Loans - Invest - Insurance - Pay Bills - Plan - Apply - About - Help - Home
© 1999, Wingspan Bank.com Privacy Policy and Terms of Use

SYSTEM AND METHOD FOR DYNAMIC, MULTIVARIABLE COMPARISON OF FINANCIAL PRODUCTS

CROSS-REFERENCE TO RELATED APPLICATIONS

This application is filed as a broadening continuation application under 35 U.S.C. § 120 of the prior application Ser. No. 09/552,879 filed on Apr. 20, 2000, entitled "System And Method For Dynamic, Multivariable Comparison of Financial Products," which is herein incorporated by reference in its entirety. Any disclaimer that may have occurred during the prosecution of the above-referenced application(s) is hereby expressly rescinded.

FIELD OF THE INVENTION

The invention relates to the field of electronic commerce, and more particularly to the dynamic, realtime comparison of financial products such as mutual funds.

BACKGROUND OF THE INVENTION

The advent of electronic commerce has led to an increasingly sophisticated array of networked financial products and services, and consumer tools to access and analyze those products and services. Online shopping comparators, in which categories of consumer goods or services are sorted by price, are known. Reverse auction services, in which a consumer names a price and then a search engine attempts to match that price amongst participating vendors, are also known. In the realm of financial products and services, a host of Internet-based banking, mutual funds, and other financial tools have been deployed.

In the case of mutual funds, the subject product involves a set of performance numbers and other quantities which require more than a simple, one-field comparison on the basis of price. As a result, shopping for networked mutual fund products typically involves running a comparison engine in which a consumer wishing to invest in a mutual fund enters a set of predefined ranges for several variables fitting their needs, and pertaining to funds in the search set. For instance, the consumer may enter a request for comparison of funds whose 5-year average return is at least 20% with an expense load of no more than 1.5%. Conventional search engines will then access some type of database whose fields correspond to these predefined variables, and return only those mutual fund products matching the complete criteria set by the inquirer.

However, those types of comparison engines suffer from more than one drawback. For one, if a candidate mutual fund lacks one of the selected criteria but very satisfactorily meets all of the remainder, conventional search engines will omit that product from the presentation of search results. Moreover, while such engines permit a user to input ranges for different criteria, once they are entered those ranges are not weighable. That is, the user is not afforded the opportunity to create a sliding scale of importance to be applied to the various quantitative factors supported by the search engine, or to sort out results once hits are found based on variable weights. In addition, conventional search engines are not equipped to allow a user to re-search an existing collection of hits by adding, deleting or adjusting one or more criteria or weights on those criteria, to refine searches and focus in on products of particular interest.

Further, conventional search engines may be constrained in the input feeds they use, and not be able to obtain multiple feeds or frequent or real-time updates. More flexible and robust financial search technology is desirable.

SUMMARY OF THE INVENTION

The invention overcoming these and other drawbacks in the art relates to a system and method for dynamic, multivariable comparison of financial products which permits consumers to select, enter, and edit criteria of their choosing, and weight those criteria according to user objectives. Search results based on this multivariable comparison may be presented in a quantitative or hybrid quantitative/graphical form, and links to service sites for purchase of the products involved may be presented. The database or databases from which candidate funds or other products are drawn for comparison by the search engine may be updated frequently or in real-time, and the search criteria may involve more than purely quantitative data. For instance, a user may wish to restrict their search for a financial or other product to subsets within certain categories, such as growth funds within the universe of available mutual funds. The invention in one embodiment is reflected in the Fund Profiler™ product of the assignee of this application.

BRIEF DESCRIPTION OF THE DRAWINGS

The invention will described with reference to the accompanying drawings, in which like elements are referenced by like numerals.

DETAILED DESCRIPTION OF PREFERRED EMBODIMENTS

Figure 1:
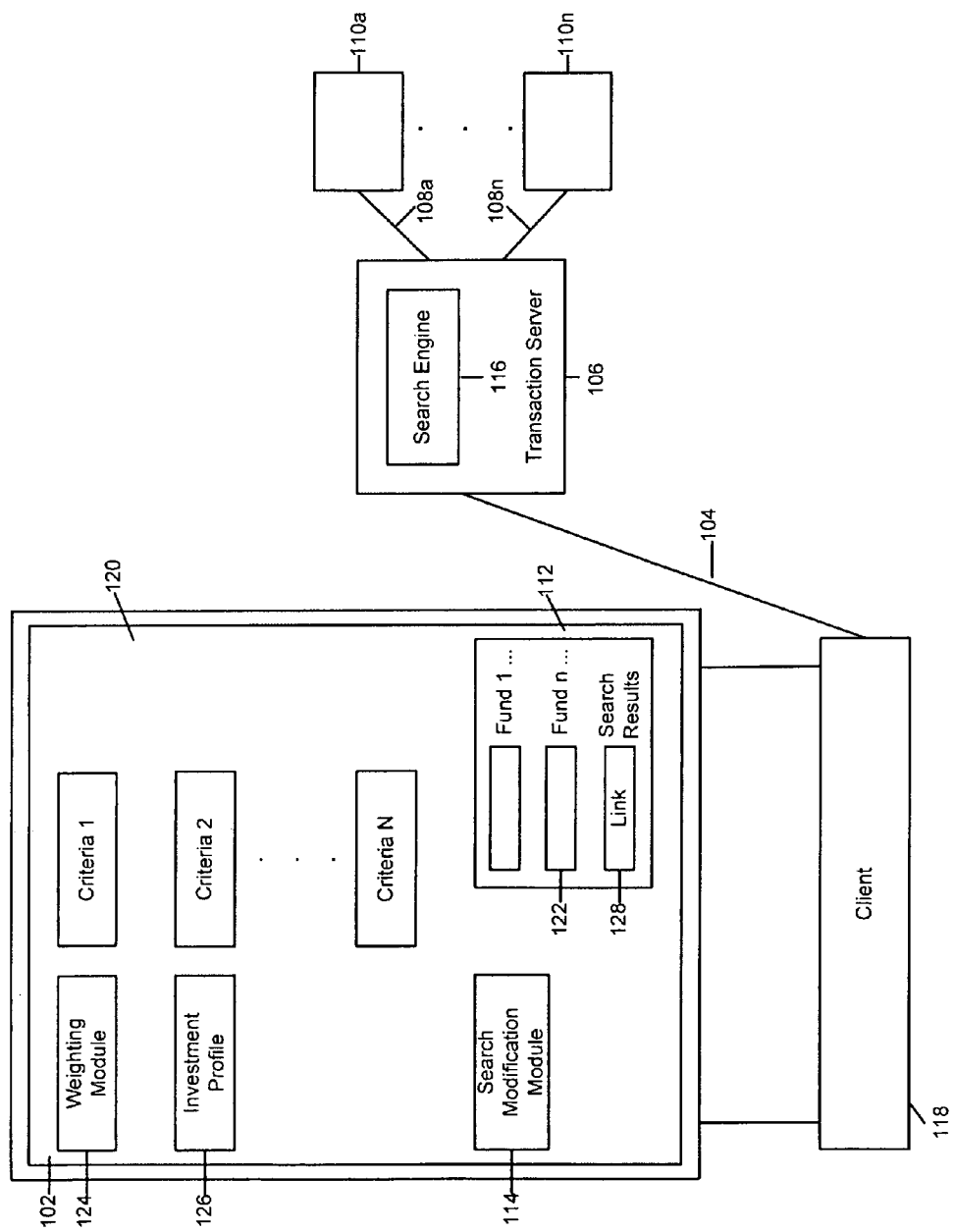
FIG. 1 illustrates a search engine architecture according to a first illustrative embodiment of the invention.

The invention will be described with reference to an illustrative architecture shown in FIG. 1, in which a transaction server 106 communicates with a variety of database and other resources to coordinate the delivery of financial comparisons to a consumer at a client 118. Client 118 is connected to the transaction server 106 via communications link 104.

Communications link 104 may be, include or access any one or more of, for instance, the Internet, an intranet, a PAN (Personal Area Network) a LAN (Local Area Network), a WAN (Wide Area Local Network), or a MAN (Metropolitan Area Network), a frame relay connection, an Advanced Intelligent Network (AIN) connection, a synchronous optical connection, DSL (Digital Subscriber Line) connection, a digital T1, T2, or E1 line, Digital Data Service (DDS) connection, DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or FDDI (Fiber Distributed Data Networks) or CDDI (Copper Distributed Data Interface) connections.

Communications link 104 may furthermore be, include or access any one or more of a WAP (Wireless Application Protocol) link, a GPRS (General Packet Radio Service) link, a GSM (Global System for Mobile Communication ) link a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth radio link, or an IEEE 802.11-based radio frequency link. Communications link 104 may yet further be, include or access any one or more of an RS-232 serial connection, an IEEE-1394 (Fire wire) connection, an IrDA (infrared) port, a SCSI (Small Computer Serial Interface) connection, a USB (Universal Serial Bus) connection or other wired or wireless, digital or analog interface or connection.

Client 118 itself may be or include, for instance, a personal computer running the Microsoft Windows™ 95, 98, Millennium, NT, or 2000, Unix, Linux, Solaris™, OS/2™, BeOS™, MacOS™, or other operating system or platform. Client 118 may include a microprocessor such as an Intel x86-based device, a Motorola 68K or PowerPC device, a MIPS, Hewlett Packard or Alpha RISC processor, a microcontroller or other general or special purpose device operating under a programmed control. Client 118 may furthermore include electronic memory such as RAM (random access memory), or EPROM (electronically programmable read only memory), storage such as hard drive, CDROM or rewritable CDROM or other magnetic, optical, or other media, and other associated components connected over an electronic bus, as will be appreciated by persons skilled in the art. Client 118 may also be a network-enabled appliance such as a WebTV™ unit, radio-enable Palm™ Pilot or similar unit, a set-top box, a game playing console such as Sony Playstation™ or Sega Dreamcast™, a browser-equipped cellular telephone, or other TCP/IP client or other device.

The transaction server 106 may be or include, for instance, a workstation running the Microsoft Windows™ NT™, Windows™ 2000, Unix, Linux, IBM AIX, Hewlett-Packard UX, Novell Netware™, Sun Microsystems Solaris™, OS/2™, BeOS™, Mach, Apache, OpenStep™, or other operating system or platform. Transaction server 106 includes or executes a search engine 116 capable of interrogating or querying a relational or other database source to execute user commands. In the illustrative embodiment, the transaction server 106 communicates via communications link 108 to a set of information sources 110a . . . 110n. The information sources 110a . . . 110n may be or include, for instance, commercially available financial or other information sources, such as a feed on a real-time or batch basis from the Lipper™ financial network source. It will be appreciated that other information sources, singly or together, may communicate with transaction server 106 to serve as raw information for customized consumer inquiries.

Search engine 116 is configured to accept information from the sources 110a . . . 110n and interrogate the resulting information feed, in relational database or other format. In one implementation of the invention, the search engine 116 may advantageously be, include or access the commercially available Frictionless™ product available from Frictionless Commerce, Inc. Search engine 116 may also be, include or access other existing data storage or management, technology such as the Oracle™ relational database sold commercially by Oracle Corp. Other databases, such as Informix™, DB2 or other data storage or query formats or platforms, such as SQL may also be used, accessed or incorporated in the invention.

In the operation of the invention, the client 118 may present a consumer wishing to inquire about mutual fund or other products with a user interface 102 laying out a set of user-selectable criteria 120, illustrated as criteria 1 . . . n. As illustrated in more detail in FIGS. 2(a)-2(y), the criteria 120 in general may include enumerated financial information such as average fund returns for 1, 5, 10 years or other applicable periods, expense loads, fund asset size, net asset value (NAV) fund type, minimum investment and other qualitative or quantitative categories of information. In addition, the user may be presented with user-definable weighting ranges on interface 102.

That is, in the illustrative embodiment, the invention presents the user via interface 102 with not just sets of quantitative or qualitative fields, but also weighting module 124 to permit a set of a weighting ranges to allow the user to attach discretionary levels of importance to those various ranges, should they be present in candidate fund. The user may assign a set of weights to those selected data, for instance categorizing different features as "must have" for greatest weighting, or lesser degrees according in one implementation to a sliding, radio-button scale as illustrated in FIG. 2(g). This means that a consumer at client 118 may receive a broad compilation of search results reflecting a collection of complex information, but sorted according to that user's particular needs.

For instance, one user may be looking for mutual fund products having the characteristics of at least a 15% average annualized return over the last five years, while being categorized conservatively as an income fund, and having an expense load of less than 1.5%. For that user and their comparison criteria, mutual fund products having those characteristics may be presented and sorted, while other mutual funds matching the quantitative criteria, but lacking the income fund category, may also be presented for completeness and flexibility. As illustrated in FIGS. 2(a)-2(y), the interface 102 of the invention may present the user with graphical result code 122 indicating the varying degree of match between the user's inputted criteria and the characteristics of the funds presented in the search results 112.

Illustratively the interface 102 may present the user with a blue bar next to entries in the search results 112 whose degree of blueness or length of bar reflects how well candidate funds or other products meet all inputted criteria. The user may, therefore, immediately isolate the products which meet all stated criteria. However, the invention may also present the user with other graphical result codes 122, such as a yellow bar, indicating that some but not all of criteria 120 were met. Nonetheless, a candidate fund marked with a yellow bar may generate a higher match score and receive a higher ordinal ranking if a given mutual fund product does not contain all stated criteria 120 of the search, however matches higher-weighted criteria to a particularly strong degree.

The resulting sort list in the search results 112 may thus present the user with a variety of matching funds, some meeting all criteria 120 while others may have fewer categorical matches but higher net match scores resulting from user-defined weighting. The weighting module 124 may store pre-assigned default values for different categories of the criteria 120, but which the user may manipulate via interface 102 to adjust up or down. The user may similarly manipulate the interface 102 to create or access an investment profile 126 for that user for the purpose of pre-filling one or more different criteria 120, for use during later sessions.

Once the user has entered or selected all criteria 120 at the client 118, the criteria 120 are communicated to the transaction server 106 for entry into the search engine 116. Search engine 116 obtains the criteria 120 for a relational or other query against the information sources 110a . . . 110n on a real-time or batch basis. Once the information sources 110a . . . 110n are interrogated the search engine 116 collects and transmits the search results 112 to the client 118 via communications link 104. The search results 112 may satisfy the user in initial form, providing enough information to permit the user to make a transaction decision. In that regard and as illustrated for instance in FIGS. 2(m), 2(x) and 2(y), interface 102 may include a transaction link 128 permitting the user to reach a linkable Web or other site via a URL or other linking resource, to enter information, obtain a prospectus, perform a transaction or take other steps.

However, in the practice of the invention if the user wishes to revise or refine search results 112, provisions made for search refinement through search modification module 114 accessible through the interface 102. The search modification module 114 allows the user to execute editing functions to alter, delete, add, or otherwise manipulate the criteria 120 to re-execute or refine the search.

If the user chooses to revise the criteria 120, they manipulate the interface 102 to enter different values, ranges, or weights for comparison against the information sources 110a . . . 110n. In one embodiment, the search results 112 may be stored locally on the client 118 so that further refinements within the search results 112 themselves may be performed without the need to communicate over communications link 104 and other facilities. Conversely, if the user wishes to add to the criteria 120, or to replace one or more of the criteria 120 with entirely new values, it may be necessary to communicate between communications link 104 and other resources to obtain new search results 112.

A revised or refined search may produce new search results 112, with recalculated and re-presented graphical results codes 122 indicating a new ordinal ranking of mutual funds or other products, again for instance using blue bars, yellow bars, or other icons or other graphical representations. It may be noted that the transmissions via communications link 104 or otherwise may be encrypted using PGP, SSL, 128-bit encryption or other security techniques.

Figure 2B:
FIGS. 2($a$)-2($y$) illustrate user interfaces and search logic for illustrative comparisons executed by the invention.
Figure 2C:
Figure 2I:
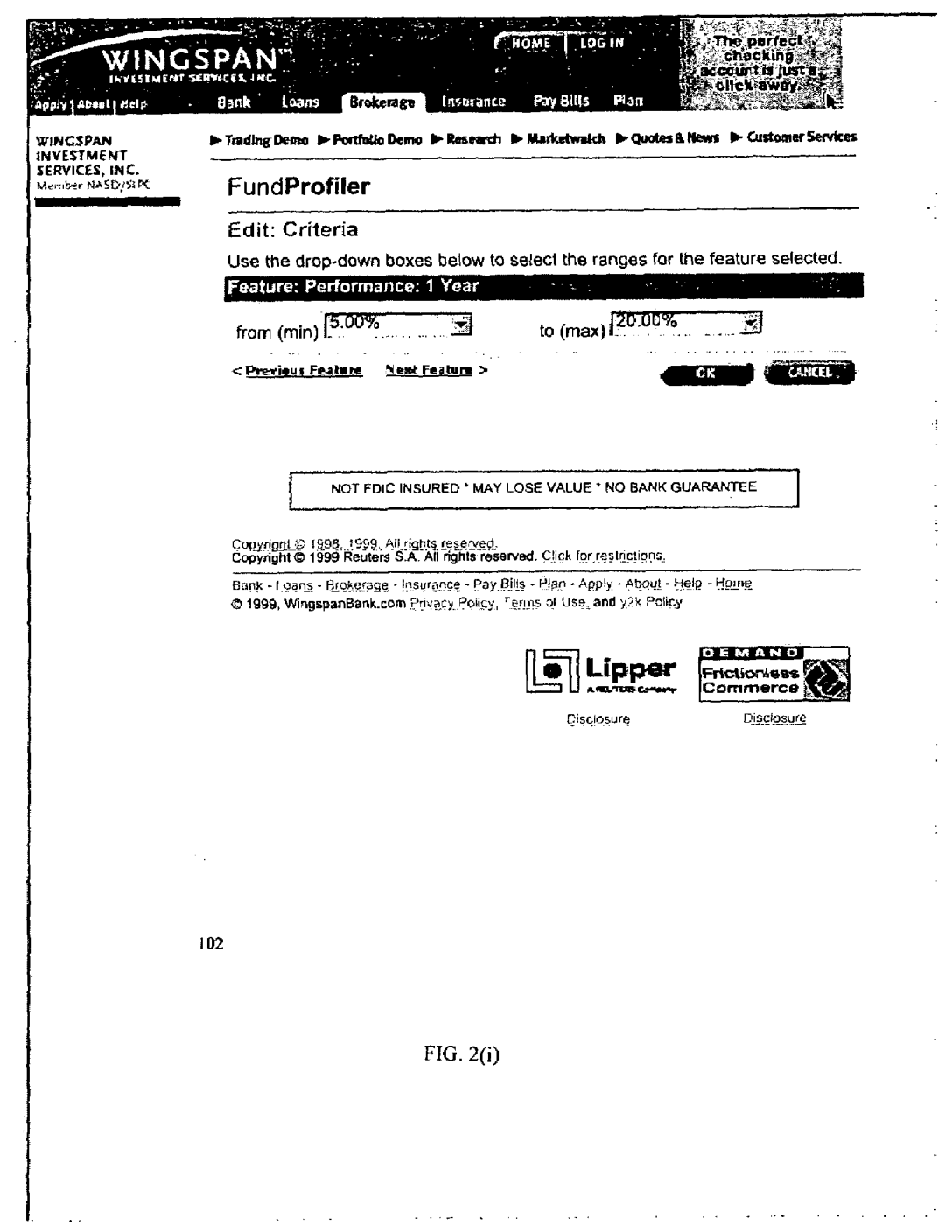
Figure 2R:
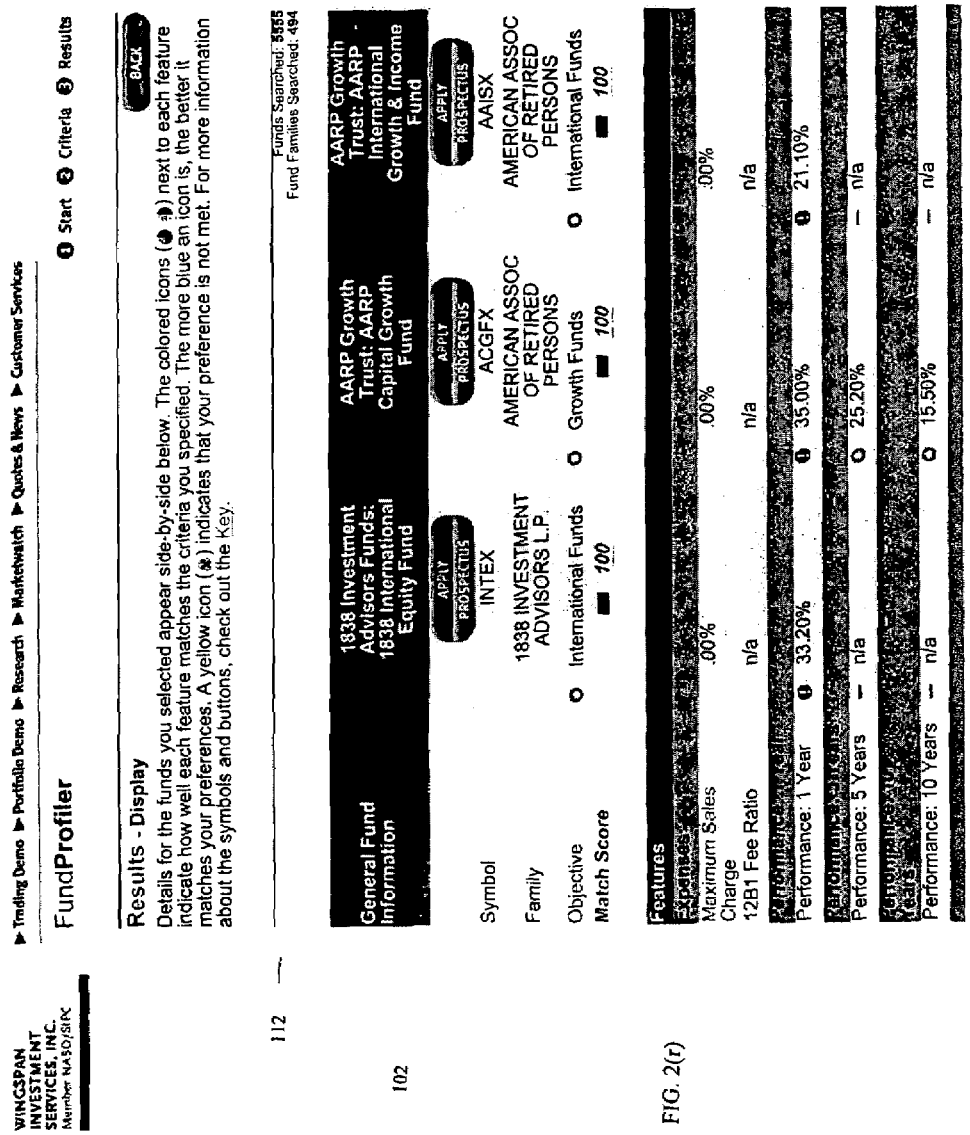

An illustrative example of a comparison session will be described with reference to FIGS. 2(a) and 2(z) in more detail. As shown in FIG. 2(a), the user interface 102 may present the user with a login screen. The user then may be presented with a selection screen as shown in FIG. 2(b) to select the profiling function of the invention. As shown in FIGS. 2(c)-2(e), the user may then be presented with a description of the service along with instructions on how to proceed with invoking a comparison session. The user may then be presented with an option to either select a predefined search profile, illustratively a set of investment objectives rated between very aggressive and very conservative, and a custom profile selection permitting individual criteria selection, as shown in FIG. 2(f).

If the user elects to set up a custom profile, then as shown in FIG. 2(g) the set of criteria 120 may be presented along with the weighting module 124 in the form of selectable radio buttons to arrange their desired complex of criteria. As shown in FIGS. 2(h) and 2(i), the user may drill down into individual ones of the criteria 120 for range selection and explanations of the pertinent data. Once the desired ranges and weights are input or selected for all of the criteria 120, the entire set of search criteria are communicated to the transaction server 106. The search engine 116 then interrogates the information sources 110a . . . 110n, and returns search results 112 illustrated in FIGS. 2(j)-2(l). As shown for instance in FIGS. 2(j)-2(l), the graphical result code 122 for each entry within the search results 112 may be included along with quantitative and other information to permit the user to compare and evaluate different products coinciding with their needs. As shown in FIG. 2(m), a transaction link 128 may be presented, in this case illustratively a request for a financial prospectus.

As illustrated in FIGS. 2(n)-2(y), once the transaction server 106 returns the search results 112 to the client 118, the search result 112 the user may drill down through the search results 112 in order to view more information about particular funds, sort the results, alter one or more of the criteria 120 and generally manipulate the user interface 102 to refine and explore the search results. As illustrated in FIG. 2(y), another possibility for the transaction link 128 as a link to a purchase site for individual funds or other products, depending on the search results 112, the user's existing account and other factors.

Figure 3:
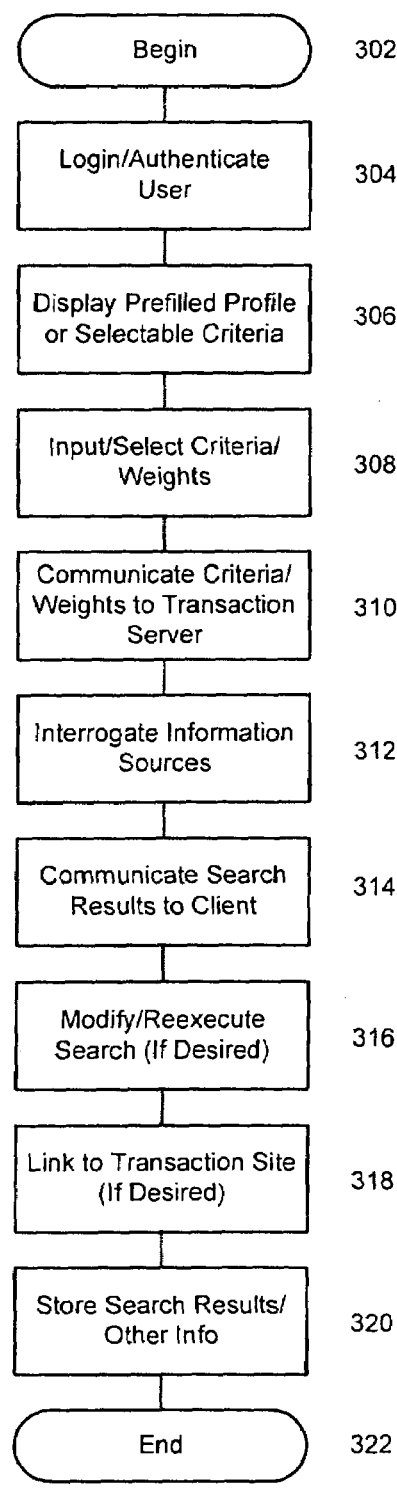
FIG. 3 illustrates a flowchart of comparison processing according to the invention.

Overall processing of mutual fund comparative profiles according to the invention is illustrated in FIG. 3. In step 302, processing begins. In step 304, a user logs in at client 118, and the login may include authentication processing if desired. In step 306, either criteria 120 to be newly entered or pre-filled criteria if investment profile 126 is activated are presented via on the interface 102. In step 308, the user selects or inputs the criteria 120 they wish to apply to the search, along with any weights via the weighting module 124. In step 310, the user's entered search information is communicated via communications link 104 to the transaction server 106.

In step 312, the search engine 116 communicates with the information sources 110a . . . 110n to interrogate those sources for matches to the user's search criteria 120. In step 314, search results 112 are communicated to the client 118 and presented to the user, which may include for example graphical result code 122, numerical data, ordinal rankings, advertising, or other information. In step 316 a revised search is executed using search modification module 114, if desired. In step 318, linking to a transaction site via a transaction link 128 is executed if the user so desires. In step 320, the search results 112 and other information may be stored on client 118, transaction server 106 or elsewhere if desired. In step 322, processing ends.

The foregoing description of the system and method for dynamic multivariable comparisons according to the invention is illustrated, and variations in configuration and implementation will occur to persons skilled in the art. For example, while search results 112 have been described as being visually presented on interface 112 of client 118, search results and related information could be communicated audibly using text-to-speech or other conversion software for delivery via telephone, pager, or other communication mode. Similarly, while the search action has been described as taking place on a single transaction server 106, a variety of distributed architectures could be used to carry out searching and processing on different resources remotely or locally, depending on architecture. The scope of the invention is accordingly intended to be limited only by the following claims.

What is claimed is:

1. A system having a processor and memory for multivariable comparison of financial information to generate search results based on user-selected quantitative search criteria and user-selected weighting criteria, comprising: a processor performing instructions for a client interface for a user to receive weightable search information, the weightable search information comprising user-selected quantitative search criteria and user-selected weighting criteria, the weighting criteria reflecting user-defined levels of importance for one or more of the quantitative search criteria; and a processor performing instructions for a search interface, communicating with the client interface, to interrogate at least one network-enabled information source according to the weightable search information to generate search results; wherein the financial information comprises a plurality of financial products, each having multiple quantitative variables associated therewith; a memory for storing the search results; the search interface being operative to compare the quantitative variables with the user-selected quantitative search criteria and the user-selected weighting criteria to generate search results comprising: a first set of financial products that do not satisfy all of the user-selected quantitative search criteria, but which satisfy the overall user-defined criteria based on the combination of the user-selected weighting criteria and the user-selected quantitative criteria, wherein the search results provide a quantitative indication of how well the search results match the weighted criteria; the search interface to perform subsequent searches within stored results of a prior search to restrict search results; the search interface operative to perform other subsequent searches to interrogate at least one network-enabled information source to expand search results; and the search interface operative to recalculate and re-present the result indicators which indicate the level the search results match the weighted criteria.

2. The system of claim 1, wherein the one or more financial products comprise one or more mutual funds.

3. The system of claim 1, further comprising a results interface operative to display the search results to the user.

4. The system of claim 3, wherein the results interface comprises a graphical user interface operative to display the one or more financial products in a sortable list.

5. The system of claim 3, wherein the one or more financial products comprise one or more mutual funds, and the results interface is operative to receive requests for a prospectus for one or more of the one or more mutual funds.

6. The system of claim 3, wherein the one or more financial products comprise one or more mutual funds, and the results interface is operative to receive requests for an application for one or more of the one or more mutual funds.

7. The system of claim 1, wherein the search results further comprise a second set of search results comprising financial products that satisfy all of the user-selected quantitative search criteria.

8. A method for multivariable comparison of financial information to generate search results based on user-selected quantitative search criteria and user-selected weighting criteria, comprising: a) receiving weightable search information from a client interface, the weightable search information comprising user-selected quantitative search criteria and user-selected weighting criteria, the weighting criteria reflecting user-defined levels of importance for one or more of the quantitative search criteria; and b) accessing at least one network-enabled information source comprising financial information regarding a plurality of financial products, each financial product having multiple quantitative variables associated therewith; c) comparing the quantitative variables with the user-selected quantitative search criteria and the user-selected weighting criteria; d) generating search results comprising: a first set of financial products that do not satisfy all of the user-selected quantitative search criteria, but which satisfy the overall user-defined criteria based on the combination of the user-selected weighting criteria and the user-selected quantitative criteria, wherein the search results indicate the level the search results match the weighted criteria; e) performing subsequent searches comprising: searching within stored results of a prior search to restrict search results; interrogating at least one network-enabled information source to expand search results; recalculating and re-presenting the result indicators which provide a quantitative indication of how well the search results match the weighted criteria.

9. The method of claim 8, wherein the one or more financial products comprise one or more mutual funds.

10. The method of claim 8, further comprising displaying the search results to the user.

11. The method of claim 10, wherein displaying the search results to the user comprises displaying the one or more financial products in a sortable list on a graphical user interface.

12. The method of claim 10, wherein the one or more financial products comprise one or more mutual funds, and the method further comprises receiving a request for a prospectus for one or more of the one or more mutual funds.

13. The method of claim 10, wherein the one or more financial products comprise one or more mutual funds, and the method further comprises receiving an application for one or more of the one or more mutual funds.

14. The method of claim 8, wherein generating search results further comprises: generating a second set of search results comprising financial products that satisfy all of the user-selected quantitative search criteria.

15. The system of claim 1 wherein search criteria are revisable during subsequent searches.

16. The method of claim 8 wherein search criteria are revisable during subsequent searches.

17. The system claim 1 wherein the addition of search criteria during subsequent searches causes at least one network-enabled information source to expand search results.

18. The method of claim 8 wherein the addition of search criteria during subsequent searches causes at least one network-enabled information source to expand search results.

19. The system of claim 1, wherein the one or more financial products comprise one or more investment funds.

20. The method of claim 8, wherein the one or more financial products comprise one or more investment funds.

* * * * *